United States Patent
Zhang et al.

(10) Patent No.: US 11,188,382 B2
(45) Date of Patent: Nov. 30, 2021

(54) CLOUD COMPUTING TASK ALLOCATION METHOD AND DEVICE, APPARATUS, AND STORAGE MEDIUM

(71) Applicants: SHENZHEN UNIVERSITY, Guangdong (CN); HARBIN INSTITUTE OF TECHNOLOGY SHENZHEN GRADUATE SCHOOL, Guangdong (CN)

(72) Inventors: Yong Zhang, Guangdong (CN); Linlin Tang, Guangdong (CN); Dongning Zhao, Guangdong (CN); Rongyu He, Guangdong (CN); Changyin Liang, Guangdong (CN); Qinghao Zeng, Guangdong (CN)

(73) Assignees: SHENZHEN UNIVERSITY, Shenzhen (CN); HARBIN INSTITUTE OF TECHNOLOGY SHENZHEN GRADUATE SCHOOL, Shenzhen (CN)

( * ) Notice: Subject to any disclaimer, the term of this patent is extended or adjusted under 35 U.S.C. 154(b) by 173 days.

(21) Appl. No.: 16/745,396

(22) Filed: Jan. 17, 2020

(65) Prior Publication Data
US 2020/0201677 A1    Jun. 25, 2020

Related U.S. Application Data

(63) Continuation of application No. PCT/CN2018/083135, filed on Apr. 15, 2018.

(30) Foreign Application Priority Data

Apr. 11, 2018    (CN) .......................... 201810321267.9

(51) Int. Cl.
*G06F 9/455* (2018.01)
*G06F 9/48* (2006.01)
(Continued)

(52) U.S. Cl.
CPC ........ *G06F 9/4881* (2013.01); *G06F 9/45558* (2013.01); *G06F 9/5077* (2013.01);
(Continued)

(58) Field of Classification Search
CPC .................................................... G06F 9/4881
(Continued)

(56) References Cited

U.S. PATENT DOCUMENTS 10,127,085 B2 *  11/2018  Li ............................ G06F 17/11
2008/0144074 A1 *  6/2008  Lin ........................ G06Q 10/06
                                                                    358/1.15
(Continued)

FOREIGN PATENT DOCUMENTS

CN    103345657 A    10/2013
CN    106936892 A    7/2017

OTHER PUBLICATIONS

Tawfeek et al. "Cloud task scheduling based on ant colony optimization". In Computer Engineering & Systems (ICCES), 2013 8th International Conference on (pp. 64-69). IEEE. (Year: 2013).*
(Continued)

*Primary Examiner* — Mehran Kamran

(57) ABSTRACT

The invention provides a cloud computing task allocation method and device, an apparatus, and a storage medium. The method comprises: when a cloud task allocation request is received, constructing a cloud task allocation model according to a to-be-allocated cloud computing task in the cloud task allocation request; optimizing cloud computing task allocation for a first preset number of times through the cloud task allocation model and an ant colony algorithm to generate the first preset number of intermediate allocation paths; evolving the intermediate allocation paths for a second preset number of times through a genetic algorithm to generate an optimum allocation path of the cloud computing (Continued)

task; and allocating the cloud computing task to a virtual machine in a cloud environment according to the optimum allocation path, so that the performance of the cloud computing task allocation is effectively improved.

7 Claims, 3 Drawing Sheets

(51) Int. Cl.
*G06F 9/50* (2006.01)
*H04L 29/08* (2006.01)
(52) U.S. Cl.
CPC ............ *G06F 9/5083* (2013.01); *H04L 67/10* (2013.01); *G06F 2009/45595* (2013.01)
(58) Field of Classification Search
USPC ............................................................ 718/1
See application file for complete search history.

(56) References Cited

U.S. PATENT DOCUMENTS

| 2008/0244584 | A1* | 10/2008 | Smith ..................... G06Q 10/06 718/102 |
| 2013/0144882 | A1* | 6/2013 | Chen ...................... G16H 20/10 707/738 |
| 2017/0329643 | A1* | 11/2017 | Wang ....................... H04L 29/06 |
| 2020/0089534 | A1* | 3/2020 | Chen ...................... G06F 9/5066 |
| 2020/0089535 | A1* | 3/2020 | Du .......................... G06N 5/003 |
| 2020/0117519 | A1* | 4/2020 | Chen ....................... G06F 13/28 |
| 2020/0265092 | A1* | 8/2020 | Zhu ..................... G06F 16/9035 |
| 2021/0117688 | A1* | 4/2021 | Teng ....................... G06F 9/5027 |
| 2021/0133534 | A1* | 5/2021 | Fu .......................... G06N 3/126 |

OTHER PUBLICATIONS

International Search Report of PCT Patent Application No. PCT/CN2018/083135 dated Jan. 4, 2019.

\* cited by examiner

CLOUD COMPUTING TASK ALLOCATION METHOD AND DEVICE, APPARATUS, AND STORAGE MEDIUM

CROSS REFERENCE TO RELATED APPLICATIONS

The present application is a Continuation Application of PCT Application No. PCT/CN2018/083135 filed on Apr. 15, 2018, which claims the benefit of Chinese Patent Application No. 201810321267.9 filed on Apr. 11, 2018. All the above are hereby incorporated by reference.

BACKGROUND OF THE INVENTION

1. Technical Field

The invention relates to the technical field of computers, in particular to a cloud computing task allocation method and device, an apparatus, and a storage medium.

2. Description of Related Art

Cloud computing, as a convenient and flexible computing mode, is a shared pool of computing resources (such as networks, servers, storage, and application program services) which can be accessed and used through the networks. The core concept of the cloud computing is to fulfill uniform management and scheduling of a large quantity of computing resources to allocate these computing resources as needed in the networks like water in daily life. Cloud computing task allocation refers to processing of a huge quantity of scheduling tasks in the case of limited cloud computing resources according to the complexity of tasks requested by users.

In recent years, the research on a cloud computing task allocation method is developing continuously. However, existing cloud computing scheduling methods cannot minimize the response time and completion time of the tasks when the users submit a large quantity of independent tasks due to its poor performance, and consequentially, it is difficult to guarantee the service quality and user experience of a cloud computing platform.

BRIEF SUMMARY OF THE INVENTION

The objective of the invention is to provide a cloud computing task allocation method and device, an apparatus, and a storage medium to solve the problem that a cloud computing task allocation method in the prior art cannot guarantee a short response time and completion time of a cloud computing task due to its poor performance.

The invention provides a cloud computing task allocation method comprising the following steps:

When a cloud task allocation request from a user is received, constructing a cloud task allocation model according to a to-be-allocated cloud computing task in the cloud task allocation request;

Optimizing cloud computing task allocation for a first preset number of times through the cloud task allocation model and a preset ant colony algorithm to generate the first preset number of intermediate allocation paths;

Evolving the intermediate allocation paths for a second preset number of times through a preset genetic algorithm to generate an optimum allocation path of the cloud computing task; and Allocating the cloud computing task to a virtual machine in a cloud environment according to the optimum allocation path.

The invention further provides a cloud computing task allocation device comprising:

A model construction unit used for constructing a cloud task allocation model according to a to-be-allocated cloud computing task in a cloud task allocation request when the cloud task allocation request from a user is received;

An ant colony optimization unit used for optimizing cloud computing task allocation for a first preset number of times through the cloud task allocation model and a preset ant colony algorithm to generate the first preset number of intermediate allocation paths;

A genetic evolution unit used for evolving the intermediate allocation paths for a second preset number of times through a preset genetic algorithm to generate an optimum allocation path of the cloud computing task; and A task allocation unit used for allocating the cloud computing task to a virtual machine in a cloud environment according to the optimum allocation path.

The invention further provides a cloud computing apparatus comprising a memory, a processor, and a computer program stored in the memory and able to run in the processor, wherein the processor executes the computer program to implement the steps of the above-mentioned cloud computing task allocation method.

The invention further provides a computer-readable storage medium having a computer program stored therein, wherein the computer program is executed by a processor to implement the steps of the above-mentioned cloud computing task allocation method.

According to the invention, the cloud task allocation model is constructed according to the to-be-allocated cloud computing task in the cloud task allocation request, the cloud computing task allocation is optimized through the cloud task allocation model and the ant colony algorithm to generate the first preset number of intermediate allocation paths, the intermediate allocation paths are evolved for the second preset number of times through the genetic algorithm to generate the optimum allocation path of the cloud computing task, and the cloud computing task is allocated to the virtual machine according to the optimum allocation path, so that when the user submits a large quantity of independent cloud computing tasks, the performance of the cloud computing task allocation is effectively improved through a hybrid swarm intelligence algorithm combining the ant colony algorithm and the genetic algorithm, a short response time and completion time of the cloud computing task are guaranteed, and accordingly, the service quality and user experience of a cloud computing platform are improved.

DETAILED DESCRIPTION OF THE INVENTION

For a better understanding of the objectives, technical solutions, and advantages of the invention, the invention is further expounded below with reference to the accompanying drawings and embodiments. It should be understood that the embodiments described herein are only used for explaining the invention, and are not used for limiting the invention.

The implementations of the invention are expounded below in combination with the following embodiments.

Embodiment 1

Figure 1:
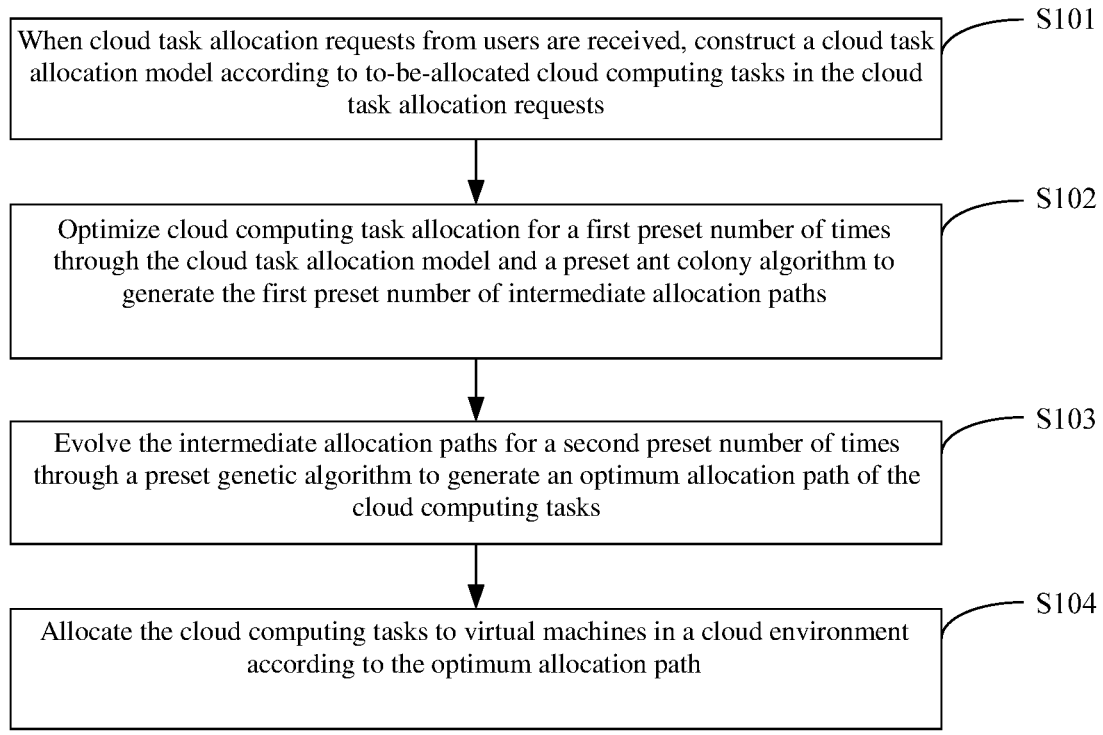
FIG. 1 is flow diagram of implementing a cloud computing task allocation method in Embodiment 1 of the invention.

FIG. 1 shows an implementation process of a cloud computing task allocation method in Embodiment 1 of the invention. For the sake of a convenient explanation, only parts relating to this embodiment are shown. The cloud computing task allocation method is expounded as follows:

In S101, when cloud task allocation requests from users are received, a cloud task allocation model is constructed according to to-be-allocated cloud computing tasks in the cloud task allocation requests.

The invention is suitable for a cloud computing platform. When the cloud task allocation requests from different users are received, the to-be-allocated cloud computing tasks are acquired from these cloud task allocation requests, and the cloud task allocation model is constructed according to these cloud computing tasks. When the cloud task allocation model is constructed, a plurality of virtual machines in a cloud environment are distributed on host machines, and cloud computing task allocation refers to allocation of the cloud computing tasks to these virtual machines, so that the cloud task allocation model can be constructed by means of a process of establishing task virtual-machine pairings.

Illustratively, m to-be-allocated cloud computing tasks $A=(a_1, a_2, \ldots, a_m)$ are acquired from the cloud task allocation requests and are executed on n virtual machines $VM=\{v_1, v_2, \ldots, v_n\}$ to form the task virtual-machine pairing $(a_i, v_j)$, and $$tc_{ij} = \frac{a_i}{v_j}$$

represents the execution time of each cloud computing task on the corresponding virtual machine.

In S102, the cloud computing task allocation is optimized for a first preset number of times through the cloud task allocation model and a preset ant colony algorithm to generate the first preset number of intermediate allocation paths.

In this embodiment, the first preset number is a preset maximum number of iterations (or the maximum number of optimization times) of the ant colony algorithm, each task virtual-machine pairing in a task virtual-machine model is set as a corresponding node, and an ant colony in the ant colony algorithm needs to search for an optimum path among these nodes. A pheromone between every two task virtual-machine pairing nodes is initialized first to generate a pheromone matrix of the ant colony algorithm, then ants in the ant colony algorithm walk to form corresponding paths among the task virtual-machine pairing nodes, and partial optimum paths of these paths are set as the intermediate allocation paths, and afterwards, the pheromone on the path allowing each ant to pass through is updated according to a running time of the cloud computing tasks on the virtual machines, so that a subsequent ant colony optimization process is guided by the pheromone.

Preferably, when each ant in the ant colony algorithm walks to form the corresponding path among the task virtual-machine pairing nodes, a next node allowing the ant to walk thereto is selected from the task virtual-machine pairing nodes through a preset probability formula, so that the path search capability of the ant colony algorithm is improved. For instance, when the task virtual-machine pairing node $(a_i, v_j)$ is located in a searchable task table of the ant k in the $t^{th}$ time of optimization, the probability of the ant k walking to the task virtual-machine pairing node $(a_i, v_j)$ is as follows:

$$P_{ij}^k(t) = \frac{[\tau_{ij}(t)]^\alpha [\gamma_{ij}(t)]^\beta}{\sum\limits_{l \in AllowedTasks(t), h \in vms} [\tau_{lh}]^\alpha [\gamma_{lh}]^\beta},$$

wherein $\tau_{ij}(t)$ and $\gamma_{ij}(t)$ respectively represent a resource pheromone concentration and an inherent resource attribute (such as computing and communication capabilities) in the $t^{th}$ time of optimization, $\alpha$ and $\beta$ respectively represent the importance of the corresponding pheromone and the inherent resource attribute, AllowedTasks(t) represents the searchable task table of the ant in the $t^{th}$ time of optimization, and vms is an optional virtual machine. When the task virtual-machine pairing node $(a_i, v_j)$ is not located in the searchable task table of the ant k in the $t^{th}$ time of optimization, the probability of the ant k walking to the task virtual-machine pairing node $(a_i, v_j)$ is 0.

In this embodiment, the ant colony algorithm simulates the ant colony phenomenon in the natural environment, so that phenomenon updating not only includes updating of the pheromones left when the ants pass through the paths, but also should take the natural volatilization of the pheromones into consideration. Preferably, a pheromone matrix update formula is expressed as follows:

$$\text{pheromone}\begin{bmatrix} p_{00} & \cdots & p_{0m} \\ \vdots & & \vdots \\ p_{n0} & \cdots & p_{nm} \end{bmatrix} =$$

$$\text{pheromone}\begin{bmatrix} p_{00} & \cdots & p_{0m} \\ \vdots & & \vdots \\ p_{n0} & \cdots & p_{nm} \end{bmatrix} * (1 - rho) + \text{Delta},$$

wherein rho is a preset volatilization factor, Delta represents the pheromones left when the ants pass through the paths and meets Delta=Q/max(costVm), Q is a preset weighting parameter, costVm[1 ... M] is time consumption of the virtual machines on the paths allowing the ants to pass through, max (costVm) is the maximum time consumption of the virtual machines on the paths allowing the ants to pass through, and accordingly, the pheromone on the corresponding path of each ant is updated according to the running time of the cloud computing tasks on the virtual machines, so that the pheromone update accuracy is effectively improved.

Further preferably, after each ant walks through the respective path, the ant passing through the corresponding partial optimum path releases a pheromone again on the partial optimum path according to a preset optimum path pheromone update formula, so that the pheromones on the global optimum paths are increased indirectly, and the global optimum paths can be searched out rapidly. Illustratively, the update value, in the optimum path pheromone update formula, of the pheromones can be expressed as follows:

$\delta = Q^-Q/bestCost$, wherein $Q^-$ is a preset weighting parameter, and bestCost is current optimum max (costVm).

In this embodiment, whether or not the number of optimization times of the ant colony algorithm reaches the first preset number is determined; if so, the optimization process of the ant colony algorithm is completed to obtain the first preset number of intermediate allocation paths; or, if not, the ants in the ant colony algorithm continuously walk among the task virtual-machine pairing nodes to form the corresponding paths.

In S103, the intermediate allocation paths are evolved for a second preset number of times through a preset genetic algorithm to generate an optimum allocation path of the cloud computing tasks.

In this embodiment, the second preset number is the maximum number of iterations (or the maximum number of evolution times) of the genetic algorithm. Preferably, it takes a long time to run each generation of the ant colony algorithm, while it takes a short time to run each generation of the genetic algorithm, and accordingly, the second preset number is set to be greater than the first preset number, so that the time cost of the cloud computing task allocation is decreased, and the effect of the cloud computing task allocation is improved.

In this embodiment, the intermediate allocation paths obtained through the ant colony algorithm are encoded first to generate a current population of the genetic algorithm; then the current population is evolved according to a preset fitness function to generate a next-generation population; and whether or not the number of evolution times of the genetic algorithm reaches the second preset number is determined; if so, an optimum individual of the next-generation population is set as the optimum allocation path of the cloud computing task allocation; or, if not, the next-generation population is set as the current population to be continuously evolved.

Preferably, when the intermediate allocation paths obtained through the ant colony algorithm are encoded, the task virtual-machine pairing nodes on each intermediate allocation path are sequenced to generate a virtual machine sequence of the intermediate allocation path, and these virtual machine sequences are set as population individuals of the current population in the genetic algorithm, so that the ant colony algorithm and the genetic algorithm are combined in the cloud computing task allocation.

Preferably, in order to complete the iteration of the genetic algorithm at a lower user cost and within a shorter time, the fitness function to be adopted is as follows:

Fitness=$Q^\wedge/r$*max(costVm)+(1−r)*Debt), wherein $Q^\wedge$ and r are preset weighting parameters, r is used for controlling the proportion between time and economic cost, and Debt is the economic cost of the cloud computing task allocation process. Illustratively, a computing formula of Debt is expressed as follows:

Debt=peNum*costPe*$\Sigma_{ilvm_r}$costVm(i)++costPerMem*ram+costPerStorage*size+costPerBw*bw, wherein peNum is the number of the host machines of one virtual machine, costPe is the cost of one virtual machine, costPerMem, costPerStorage, and costPerBw are respectively an internal storage cost, a memory cost, and a bandwidth cost in a cloud computing environment, and ram, size, and bw are respectively an internal storage capacity, a memory size, and a bandwidth number in the cloud computing environment.

In S104, the cloud computing tasks are allocated to the virtual machines in the cloud environment according to the optimum allocation path.

In this embodiment, after the optimum allocation path is obtained, all the cloud computing tasks are allocated to the virtual machines according to the optimum allocation path to complete the cloud computing task allocation. In the specific experimental process, after the optimum allocation path is obtained, a cloud computing experiment can be simulated on a cloud computing simulation tool and a distributed system simulator (such as a CloudSim tool) having the cloud computing environment to reduce the research and test threshold and cost of the cloud computing task allocation.

In this embodiment, the cloud computing task allocation is optimized through the ant colony algorithm to generate the first preset number of intermediate allocation paths, and the intermediate allocation paths are evolved for the second preset number of times through the genetic algorithm to generate the optimum allocation path of the cloud computing tasks, so that the performance of the cloud computing task allocation is effectively improved through a hybrid swarm intelligence algorithm which combines the ant colony algorithm and the genetic algorithm and integrates the good robustness and solution search capability of the ant colony algorithm and the global space search capability and concurrency of the genetic algorithm, a short response time and completion time of the cloud computing tasks are guaranteed, and accordingly, the service quality and user experience of the cloud computing platform are improved.

Embodiment 2

Figure 2:
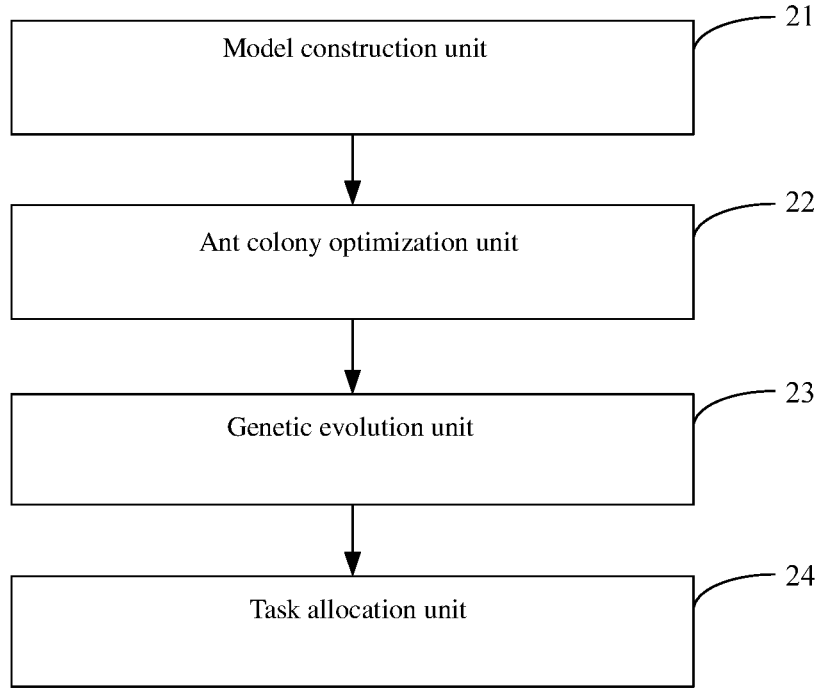
FIG. 2 is a structural view of a cloud computing task allocation device in Embodiment 2 of the invention.

FIG. 2 shows a structure of a cloud computing task allocation device in Embodiment 2 of the invention. For the sake of a convenient explanation, only parts relating to this embodiment are shown. The cloud computing task allocation device includes:

A model construction unit 21 used for constructing a cloud task allocation model according to to-be-allocated cloud computing tasks in cloud task allocation requests when the cloud task allocation requests from users are received.

In this embodiment, when the cloud task allocation requests of different users are received, the to-be-allocated cloud computing tasks are acquired from these cloud task allocation requests, and the cloud task allocation model is constructed according to these cloud computing tasks. When the cloud task allocation model is constructed, a plurality of virtual machines in a cloud environment are distributed on host machines, and cloud computing task allocation refers to allocation of the cloud computing tasks to these virtual machines, so that the cloud task allocation model can be constructed by means of a process of establishing task virtual-machine pairings.

An ant colony optimization unit 22 used for optimizing the cloud computing task allocation for a first preset number of times through the cloud task allocation model and a preset ant colony algorithm to generate the first preset number of intermediate allocation paths.

In this embodiment, a pheromone between every two task virtual-machine pairing nodes is initialized first to generate a pheromone matrix of the ant colony algorithm, then ants in the ant colony algorithm walk to form corresponding paths among the task virtual-machine pairing nodes, and partial optimum paths of these paths are set as the intermediate allocation paths, and afterwards, the pheromone on the path allowing each ant to pass through is updated according to a running time of the cloud computing tasks on the virtual machines, so that a subsequent ant colony optimization process is guided by the pheromone.

Preferably, when each ant in the ant colony algorithm walks to form the corresponding path among the task virtual-machine pairing nodes, a next node allowing the ant to walk thereto is selected from the task virtual-machine pairing nodes through a preset probability formula, so that the path search capability of the ant colony algorithm is improved.

In this embodiment, the ant colony algorithm simulates the ant colony phenomenon in the natural environment, so that phenomenon updating not only includes updating of the pheromones left when the ants pas through the paths, but also should take the natural volatilization of the pheromones into consideration Preferably, a pheromone matrix update formula is expressed as follows:

$$\text{pheromone} \begin{bmatrix} p_{00} & \cdots & p_{0m} \\ \vdots & & \vdots \\ p_{n0} & \cdots & p_{nm} \end{bmatrix} = \text{pheromone} \begin{bmatrix} p_{00} & \cdots & p_{0m} \\ \vdots & & \vdots \\ p_{n0} & \cdots & p_{nm} \end{bmatrix} * (1 - rho) + \text{Delta},$$

wherein rho is a preset volatilization factor, Delta represents the pheromones left when the ants pass through the paths and meets Delta=Q/max(costVm), Q is a preset weighting parameter, costVm[1 . . . M] is time consumption of the virtual machines on the paths allowing the ants to pass through, max (costVm) is the maximum time consumption of the virtual machines on the paths allowing the ants to pass through, and accordingly, the pheromone on the corresponding path of each ant is updated according to the running time of the cloud computing tasks on the virtual machines, so that the pheromone update accuracy is effectively improved.

Further preferably, after each ant walks through the respective path, the ant passing through the corresponding partial optimum path releases a pheromone again on the partial optimum path according to a preset optimum path pheromone update formula, so that the pheromones on the global optimum paths are increased indirectly, and the global optimum paths can be searched out rapidly.

In this embodiment, whether or not the number of optimization times of the ant colony algorithm reaches the first preset number is determined; if so, the optimization process of the ant colony algorithm is completed to obtain the first preset number of intermediate allocation paths; or, if not, the ants in the ant colony algorithm continuously walk among the task virtual-machine pairing nodes to form the corresponding paths.

A genetic evolution unit 23 used for evolving the intermediate allocation paths for a second preset number of times through a preset genetic algorithm to generate an optimum allocation path of the cloud computing tasks.

In this embodiment, the second preset number is the maximum number of iterations (or the maximum number of evolution times) of the genetic algorithm. Preferably, it takes a long time to run each generation of the ant colony algorithm, while it takes a short time to run each generation of the genetic algorithm, and accordingly, the second preset number is set to be greater than the first preset number, so that the time cost of the cloud computing task allocation is decreased, and the effect of the cloud computing task allocation is improved.

In this embodiment, the intermediate allocation paths obtained through the ant colony algorithm are encoded first to generate a current population of the genetic algorithm; then the current population is evolved according to a preset fitness function to generate a next-generation population; and whether or not the number of evolution times of the genetic algorithm reaches the second preset number is determined; if so, an optimum individual of the next-generation population is set as the optimum allocation path of the cloud computing task allocation; or, if not, the next-generation population is set as the current population to be continuously evolved.

Preferably, when the intermediate allocation paths obtained through the ant colony algorithm are encoded, the task virtual-machine pairing nodes on each intermediate allocation path are sequenced to generate a virtual machine sequence of the intermediate allocation path, and these virtual machine sequences are set as population individuals of the current population in the genetic algorithm, so that the ant colony algorithm and the genetic algorithm are combined in the cloud computing task allocation.

Preferably, in order to complete the iteration of the genetic algorithm at a lower user cost within a shorter time, the fitness function to be adopted is as follows:

Fitness=$Q\hat{\ }/(r*\max(costVm)+(1-r)*Debt)$, wherein $Q\hat{\ }$ and r are preset weighting parameters, r is used for controlling the proportion between time and economic cost, and Debt is the economic cost of the cloud computing task allocation process. Illustratively, a computing formula of Debt is expressed as follows:

Debt=peNum*costPe*$\Sigma_{ilvms}$costVm(i)++ costPerMem*ram+costPerStorage*size+costPerBw*bw, wherein peNum is the number of the host machines of one virtual machine, costPe is the cost of one virtual machine, costPerMem, costPerStorage, and costPerBw are respectively an internal storage cost, a memory cost, and a bandwidth cost in a cloud computing environment, and ram, size, and bw are respectively an internal storage capacity, a memory size, and a bandwidth number in the cloud computing environment.

A task allocation unit 24 used for allocating the cloud computing tasks to the virtual machines in the cloud environment according to the optimum allocation path.

In this embodiment, after the optimum allocation path is obtained, all the cloud computing tasks are allocated to the virtual machines according to the optimum allocation path to complete the cloud computing task allocation. In the specific experimental process, after the optimum allocation path is obtained, a cloud computing experiment can be simulated on a cloud computing simulation tool and a distributed system simulator (such as a CloudSim tool) having the cloud computing environment to reduce the research and test threshold and cost of the cloud computing task allocation.

Figure 3:
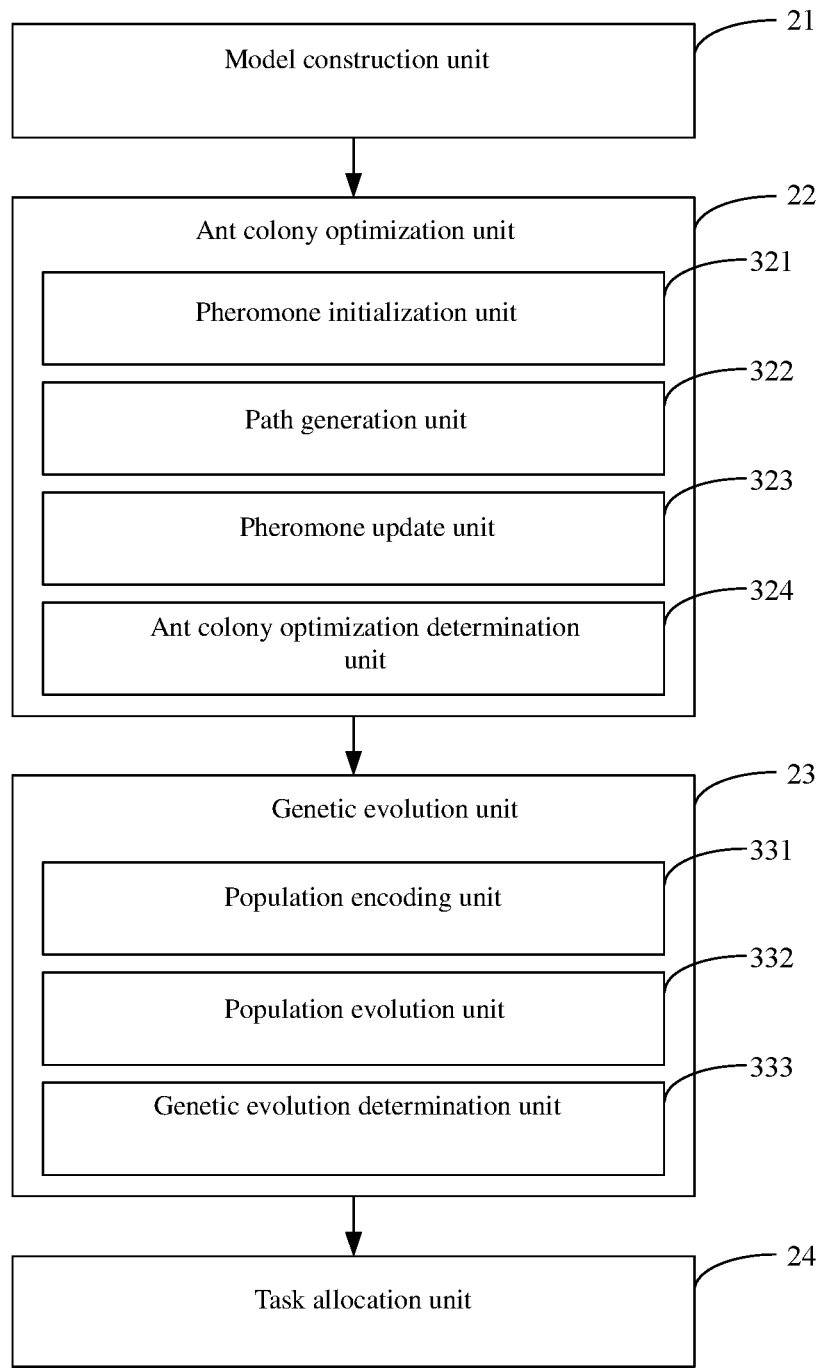
FIG. 3 is a preferred structural view of the cloud computing task allocation device in Embodiment 2 of the invention.

Preferably, as shown in FIG. 3, the ant colony optimization unit 22 includes:

A pheromone initialization unit 321 used for initializing the pheromone between every two task virtual-machine pairing nodes in the task allocation model to generate the pheromone matrix of the ant colony algorithm;

A path generation unit 322 used for generating the corresponding paths among the task virtual-machine pairing nodes by means of the ants in the ant colony algorithm and setting the partial optimum path of the corresponding path of each ant as the corresponding intermediate allocation path;

A pheromone update unit 323 used for updating the pheromone on the corresponding path of each ant according to the running time, on the virtual machines in the cloud environment, of the cloud computing tasks in the task allocation model; and An ant colony optimization determination unit 324 used for determining whether or not the number of optimization times of the ant colony algorithm reaches the first preset number, and if so, completing the optimization process of the ant colony algorithm, or if not, triggering the path generation unit 322 to generate the corresponding paths among the task virtual-machine pairing nodes by means of the ants in the ant colony algorithm.

Preferably, the genetic evolution unit 23 includes:

A population encoding unit 331 used for encoding the intermediate allocation paths to generate the current population of the genetic algorithm;

A population evolution unit 332 used for evolving the current population according to the preset fitness function to generate the next-generation population; and A genetic evolution determination unit 333 used for determining whether or not the number of evolution times of the genetic algorithm reaches the second preset number, and if so, setting the optimum individual of the next-generation population as the optimum allocation path, or if not, setting the next-generation population as the current population and triggering the population evolution unit 332 to evolve the current population according to the preset fitness function.

In this embodiment, the cloud computing task allocation is optimized through the ant colony algorithm to generate the first preset number of intermediate allocation paths, and the intermediate allocation paths are evolved for the second preset number of times through the genetic algorithm to generate the optimum allocation path of the cloud computing tasks, so that the performance of the cloud computing task allocation is effectively improved through a hybrid swarm intelligence algorithm which combines the ant colony algorithm and the genetic algorithm and integrates the good robustness and solution search capability of the ant colony algorithm and the global space search capability and concurrency of the genetic algorithm, a short response time and completion time of the cloud computing tasks are guaranteed, and accordingly, the service quality and user experience of a cloud computing platform are improved.

In this embodiment, the units of the cloud computing task allocation device may be corresponding hardware or software units, may be independent hardware and software units, or may be integrated to form one software and hardware unit, which is not intended to limit the invention herein.

Embodiment 3

Figure 4:
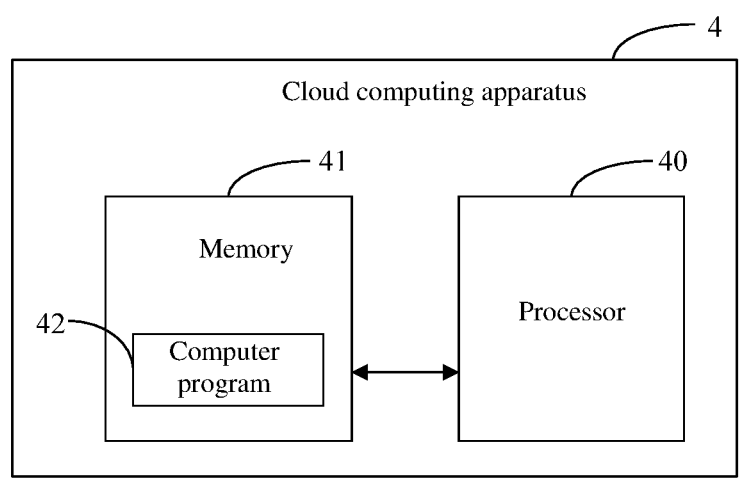
FIG. 4 is a structural view of a cloud computing apparatus in Embodiment 3 of the invention.

FIG. 4 shows a structure of a cloud computing apparatus in Embodiment 3 of the invention. For the sake of a convenient explanation, only parts related to this embodiment are shown.

The cloud computing apparatus 4 in this embodiment comprise a processor 40, a memory 41, and a computer program 42 stored in the memory 41 and able to run in the processor 40. The processor 40 executes the computer program 42 to implement the steps of the method in the above embodiment such as steps S101-S104 shown in FIG. 1, or to fulfill the functions of the units of the device in the above embodiment such as the functions of units 21-24 shown in FIG. 2.

In this embodiment, cloud computing task allocation is optimized through an ant colony algorithm to generate a first preset number of intermediate allocation paths, and the intermediate allocation paths are evolved for a second preset number of times through a genetic algorithm to generate an optimum allocation path of cloud computing tasks, so that the performance of the cloud computing task allocation is effectively improved through a hybrid swarm intelligence algorithm which combines the ant colony algorithm and the genetic algorithm and integrates the good robustness and solution search capability of the ant colony algorithm and the global space search capability and concurrency of the genetic algorithm, a short response time and completion time of the cloud computing tasks are guaranteed, and accordingly, the service quality and user experience of a cloud computing platform are improved.

Embodiment 4

A computer-readable storage medium in this embodiment has a computer program stored therein. The computer program is executed by a processor to implement the steps of the method in the above embodiment such as steps S101-S104 shown in FIG. 1, or to fulfill the functions of the units of the device in the above embodiment such as the functions of units 21-24 shown in FIG. 2.

In this embodiment, cloud computing task allocation is optimized through an ant colony algorithm to generate a first preset number of intermediate allocation paths, and the intermediate allocation paths are evolved for a second preset number of times through a genetic algorithm to generate an optimum allocation path of cloud computing tasks, so that the performance of the cloud computing task allocation is effectively improved through a hybrid swarm intelligence algorithm which combines the ant colony algorithm and the genetic algorithm and integrates the good robustness and solution search capability of the ant colony algorithm and the global space search capability and concurrency of the genetic algorithm, a short response time and completion time of the cloud computing tasks are guaranteed, and accordingly, the service quality and user experience of a cloud computing platform are improved.

The computer-readable storage medium in this embodiment may be any entity or device capable of carrying computer program codes, or a record medium such as an ROM/RAM, a disk, an optical disk, a flash memory, and other memories.

The above embodiments are only preferred ones of the invention, and are not intended to limit the invention. Any modifications, equivalent substitutes and improvements achieved based on the spirit and principle of the invention should also fall within the protection scope of the invention.

What is claimed is:

1. A cloud computing task allocation method, comprising the following steps:
    when a cloud task allocation request from a user is received, constructing a cloud task allocation model according to a to-be-allocated cloud computing task in the cloud task allocation request;
    optimizing cloud computing task allocation for a first preset number of times through the cloud task allocation model and a preset ant colony algorithm to generate the first preset number of intermediate allocation paths;

evolving the intermediate allocation paths for a second preset number of times through a preset genetic algorithm to generate an optimum allocation path of the cloud computing task; and allocating the cloud computing task to a virtual machine in a cloud environment according to the optimum allocation path;

wherein the step of optimizing cloud computing task allocation for a first preset number of times through the cloud task allocation model and a preset ant colony algorithm to generate the first preset number of intermediate allocation paths comprises:

initializing a pheromone between every two task virtual-machine pairing nodes in the task allocation model to generate a pheromone matrix of the ant colony algorithm;

generating corresponding paths among the task virtual-machine pairing nodes by means of ants in the ant colony algorithm, and setting a partial optimum path of the corresponding path of each said ant as one said intermediate allocation path;

updating the pheromone on the corresponding path of each said ant according to a running time, on the virtual machine in the cloud environment, of the cloud computing task in the task allocation model; and determining whether or not the number of optimization times of the ant colony algorithm reaches the first preset number; if so, completing an optimization process of the ant colony algorithm; or if not, performing the step of generating corresponding paths among the task virtual-machine pairing nodes by means of ants in the ant colony algorithm.

2. The method according to claim 1, wherein the method further comprises the following step performed after the step of updating the pheromone on the corresponding path of each said ant and before the step of determining whether or not the number of optimization times of the ant colony algorithm reaches the first preset number:

updating the pheromone on the partial optimum path through each said ant passing through the partial optimum path according to a preset optimum path pheromone update formula.

3. The method according to claim 1, wherein the step of evolving the intermediate allocation paths for a second preset number of times through a preset genetic algorithm to generate an optimum allocation path of the cloud computing task comprises:

encoding the intermediate allocation paths to generate a current population of the genetic algorithm;

evolving the current population according to a preset fitness function to generate a next-generation population; and determining whether or not the number of evolution times of the genetic algorithm reaches the second preset number; if so, setting an optimum individual of the next-generation population as the optimum allocation path; or, if not, setting the next-generation population as the current population, and performing the step of evolving the current population according to a preset fitness function.

4. The method according to claim 3, wherein the step of encoding the intermediate allocation paths comprises:

sequencing task virtual-machine pairing nodes on the intermediate allocation paths to generate a virtual machine sequence of the intermediate allocation paths; and setting the virtual machine sequence as a population individual in the genetic algorithm to form the current population by means of the population individual.

5. A non-transitory computer-readable storage medium, having a computer program stored therein, wherein the computer program is executed by a processor to implement the steps of the method according to claim 1.

6. A cloud computing task allocation device, comprising:

a model construction unit used for constructing a cloud task allocation model according to a to-be-allocated cloud computing task in cloud task allocation request when the cloud task allocation request from a user is received;

an ant colony optimization unit used for optimizing cloud computing task allocation for a first preset number of times through the cloud task allocation model and a preset ant colony algorithm to generate the first preset number of intermediate allocation paths;

a genetic evolution unit used for evolving the intermediate allocation paths for a second preset number of times through a preset genetic algorithm to generate an optimum allocation path of the cloud computing task; and a task allocation unit used for allocating the cloud computing task to a virtual machine in a cloud environment according to the optimum allocation path;

wherein the ant colony optimization unit includes:

a pheromone initialization unit used for initializing a pheromone between every two task virtual-machine pairing nodes in the task allocation model to generate a pheromone matrix of the ant colony algorithm;

a path generation unit used for generating corresponding paths among the task virtual-machine pairing nodes by means of ants in the ant colony algorithm and setting a partial optimum path of the corresponding path of each said ant as one said intermediate allocation path;

a pheromone update unit used for updating the pheromone on the corresponding path of each said ant according to a running time, on the virtual machine in the cloud environment, of the cloud computing task in the task allocation model; and an ant colony optimization determination unit used for determininq whether or not the number of optimization times of the ant colony algorithm reaches the first preset number, and if so, completing an optimization process of the ant colony algorithm; or if not, triggering the path generation unit to generate the corresponding paths among the task virtual-machine pairing nodes by means of the ants in the ant colony algorithm.

7. The device according to claim 6, wherein the genetic evolution unit includes:

a population encoding unit used for encoding the intermediate allocation paths to generate a current population of the genetic algorithm;

a population evolution unit used for evolving the current population according to a preset fitness function to generate a next-generation population; and a genetic evolution determination unit used for determining whether or not the number of evolution times of the genetic algorithm reaches the second preset number, and if so, setting an optimum individual of the next-generation population as the optimum allocation path, or, if not, setting the next-generation population as the current population and triggering the population evolution unit to evolve the current population according to the preset fitness function.

\* \* \* \* \*